United States Patent [19]

Green

[11] Patent Number: 4,862,892
[45] Date of Patent: Sep. 5, 1989

[54] ULTRASONIC REFLEX TRANSMISSION IMAGING METHOD AND APPARATUS WITH ARTIFACT REMOVAL

[75] Inventor: Philip S. Green, Redwood City, Calif.

[73] Assignee: SRI International, Menlo Park, Calif.

[21] Appl. No.: 220,520

[22] Filed: Jul. 18, 1988

[51] Int. Cl.[4] .................................................. A61B 8/00
[52] U.S. Cl. .................................. 128/660.07; 73/620
[58] Field of Search ...................... 128/660.06–661.01; 73/602, 620, 626

[56] References Cited

U.S. PATENT DOCUMENTS

| | | | |
|---|---|---|---|
| 4,442,713 | 4/1984 | Wilson et al. | 73/626 X |
| 4,470,303 | 9/1984 | O'Donnell | 73/602 |
| 4,509,524 | 4/1985 | Miwa | 128/660.06 |
| 4,519,260 | 5/1985 | Fu et al. | 128/661.1 X |
| 4,750,366 | 6/1988 | Nicolas | 128/660.06 |
| 4,757,715 | 7/1988 | Miwa et al. | 128/660.06 X |

*Primary Examiner*—Francis Jaworski
*Attorney, Agent, or Firm*—Victor R. Beckman

[57] ABSTRACT

A reflex transmission ultrasonic imaging system and method are shown which include a transducer (10) for pulse insonification (14) of an object (12) and for receiving echo signals from within the object. Echo signals are converted to electrical signals at the transducer (10) and the electrical signals are supplied to a signal processor (38) through a switching matrix (20), delays (22), and transmit-receive switches (18). The signal processor includes a detector (46) and integrator (48) for integrating the detector output. Echo signals obtained from a range zone (BZ) opposite a focal point (F) are processed by processor (38) and supplied to hold circuit (60) to provide an image pixel signal value. A compensation pixel signal value for hold circuit (64) is obtained by repeating the transmitting-receiving operation using a beam which is unfocused at any point along the beam axis between the transducer (10) and backscatter zone (BZ). The image and compensation pixel signals from hold circuits (60) and (64) are combined at combiner (68) to provide for a compensated image pixel signal output from the combiner. Artifacts which other wise would result from non-uniform reflective properties of the beackscatter zone (BZ) are removed by this process. Compensated image pixel signals are displayed at display (72).

22 Claims, 4 Drawing Sheets

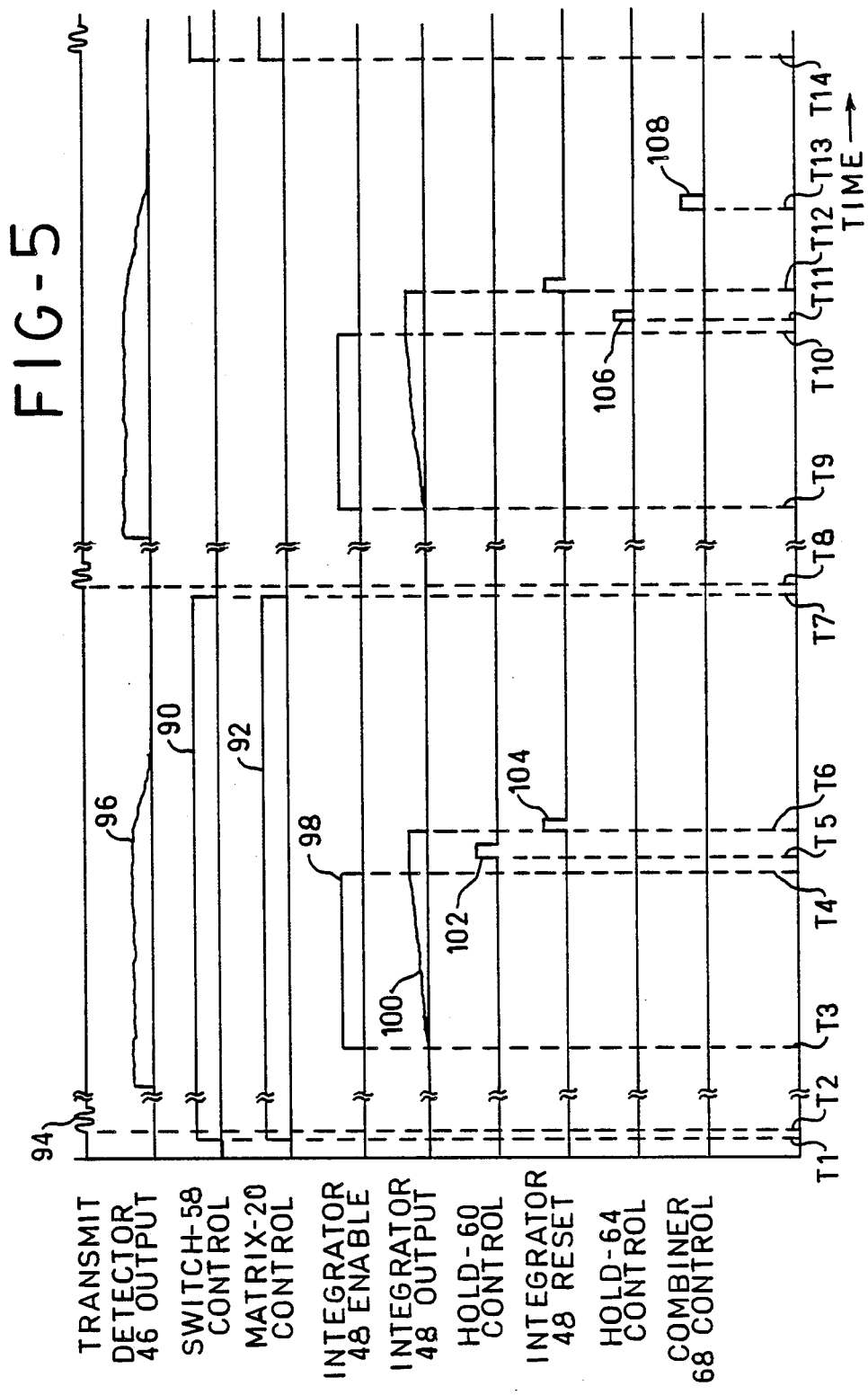

ULTRASONIC REFLEX TRANSMISSION IMAGING METHOD AND APPARATUS WITH ARTIFACT REMOVAL

ORIGIN OF THE INVENTION

This invention was made in part or in whole with United States Government Support under a grant with the National Institutes of Health. The U.S. Government has certain rights in this invention.

TECHNICAL FIELD

This invention relates to an ultrasonic reflex transmission imaging method and apparatus which includes means for removing artifacts which result from inhomogeneity of the backscatter zone from which echo signals are received and processed.

BACKGROUND OF THE INVENTION

An ultrasonic imaging system of the reflex transmission type is shown in U.S. Pat. No. 4,608,868, P. S. Green. The use of an external reflector with such a system is shown in U.S. Pat. No. 4,624,143, P. S. Green. U.S. Patent No. 4,730,495, P. S. Green, discloses means for processing signals from backscatter zones that are not substantially uniform in reflective properties by automatic adjustment of the length of the range zone and weighting of the processed signal accordingly. In U.S. Pat. No. 4,513,749, G. S. Kino, a three-dimensional temperature probe is shown which includes means for measuring local variations in the speed of sound for use in compensating for such sound variations.

SUMMARY AND OBJECTS OF THE INVENTION

An object of this invention is the provision of ultrasonic reflex transmission imaging method and apparatus for improved imaging.

An object of this invention is the provision of improved ultrasonic reflex transmission imaging method and apparatus whereby high quality images may be obtained from within objects even though the backscatter zone from which echo signals are processed is not homogeneous in its reflectivity.

An object of this invention is the provision of ultrasonic reflex transmission imaging method and apparatus of the above-mentioned type which includes means for the removal of artifacts which otherwise would result from non-uniform reflective properties of the backscatter zone from which echo signals are processed.

A conventional ultrasonic reflex transmission imaging apparatus includes a transducer and associated pulse transmitter-receiver means for beaming ultrasonic wave energy into a section within an object to be examined and for processing echo signals. Transducer focusing means are included for focusing the transducer at a point within the object, and scanning means provide for scanning of the object. The receiver processes echo signals received from a backscatter zone located beyond the point at which the transducer is focused. Echo signal processing includes the use of detection and integration means for detecting and integrating the detected signal over the time period that the echo signal is received from the backscatter zone. An uncompensated image pixel signal value related to acoustic attenuation at the focal point is provided at the output from the integration means. However, this uncompensated image pixel signal value also is dependent upon reflectivity of the backscatter zone whereby the image pixel signal value depends not only upon absorption at the focal point but also depends upon said reflectivity.

In accordance with the present invention a compensation pixel signal value is generated which provides a measure of reflectivity of said backscatter zone but which is substantially independent of attenuation at said focal point, or at any other focal point at which the transducer may be focused. The compensation pixel signal value is obtained by transmitting a second ultrasonic energy pulse into the object along the same beam axis as the imaging beam to pulse insonify substantially the same volume in the backscatter zone insonified when obtaining the image pixel signal value. The echo signal received from the backscatter zone is detected and integrated to provide a compensation pixel signal value which is combined with the image pixel signal value to provide for a compensated pixel signal value. Combining the image and compensation pixel signal values simply may comprise dividing the image pixel signal by the compensation pixel signal.

The invention, together with other objects, features and advantages thereof will be more fully understood from a consideration of the following detailed description of certain embodiments thereof taken in connection with the accompanying drawings. It here will be understood that the drawings are for purposes of illustration only and that the invention is not limited to the specific embodiments disclosed therein.

BRIEF DESCRIPTION OF THE DRAWINGS

In the drawings, wherein like reference characters refer to the same parts in the several views:

FIG. 5 is a timing diagram for use in explaining operation of the system shown in FIG. 1.

Figure 1:
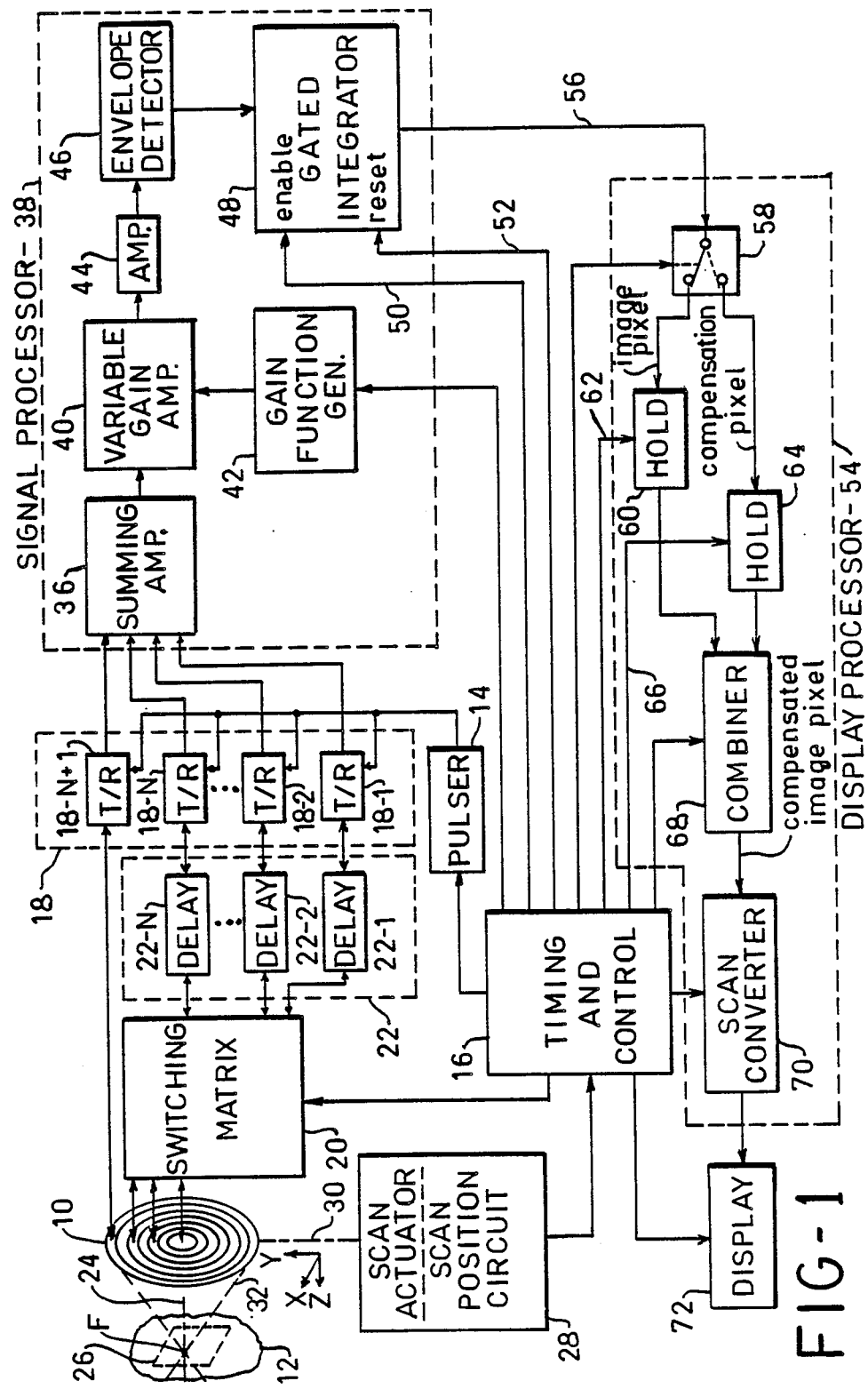
FIG. 1 is a block diagram showing an ultrasonic reflex transmission imaging system embodying the present invention.

Reference first is made to FIG. 1 wherein there is shown an ultrasonic reflex transmission imaging system comprising transducer 10 which, in the illustrated arrangement, is used for both transmitting and receiving ultrasonic pulse signals. For purposes of illustration, an annular transducer array is shown comprising a plurality of elements including a central circular element and a plurality of concentrically disposed annular electrodes surrounding the central electrode. Ultrasonic compressional waves generated by transducer 10 are coupled through suitable acoustic transmission medium such as water, not shown, to the subject 12 under investigation for pulse insonification thereof.

The transmitting portion of the system includes a pulser 14 which is supplied with recurrent timing pulses from a timing and control unit 16 for onoff control thereof. With the pulser turned on, a high frequency energy pulse is generated which is connected through transmit-receive switch unit 18 to a switching matrix 20. Time delay means 22, comprising a plurality of delay elements 22-1 through 22-N, are included in the connection of all but one of the transmit-receive switches to the switching matrix. One transmit-receive switch 18-N+1 is directly connected to the switching matrix with no time delay means included in the interconnection thereof.

Elements of the transducer array 10 are connected to signal delay means 22 through the switching matrix for focus control of the transducer array and also aperture control, if desired. Timing and control signals from timing and control unit 16 are supplied to the switching matrix 20 for selecting delay elements, and transducer elements, to be employed during transmission-receiving operations. The signal delay means 22, for the delay of transmitter signals supplied to the transducer array and of signals received from the array, provide for focus control, the focus being dependent upon which of the delay elements 22-1 through 22-N are employed in the connection of transducer elements to the pulsed transmitter-receiver.

In FIG. 1 the ultrasonic beam axis is identified by reference numeral 24 and, in the illustrated arrangement, a C-scan image of plane 26 normal to axis 24 is obtained by movement of the focal point F in the plane to scan the same. The transducer 10 is scanned in the x and y directions shown in FIG. 1 by scan actuator 28 connected thereto through mechanical linkage 30. The scanning mechanism 28 includes a scan position information circuit having an output connected to timing and control unit 16, which, in turn, as noted above, has outputs for synchronizing the transmitting, receiving and display scanning operations. Obviously, the image may be scanned using different scanning patterns, such as a combination angular and rectilinear scanning pattern. Also, electronic scanning in place of the illustrated mechanical scanning may be employed. With the present invention, the transducer is focused in focal plane 26 only when obtaining image pixel signal values, and is not focused in plane 26 when obtaining compensation pixel signal values.

Figure 2:
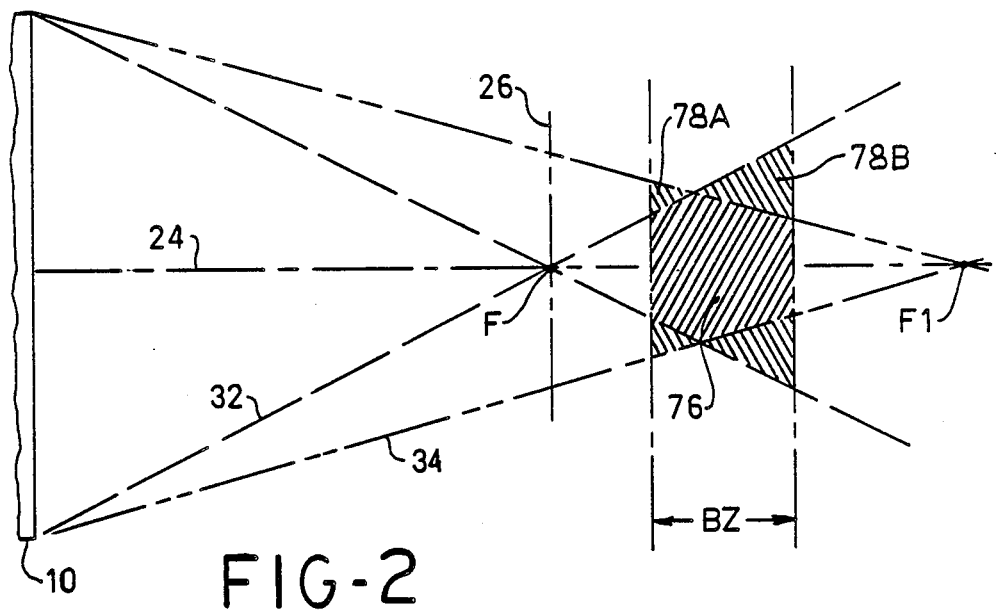
FIGS. 2, 3 and 4 show image beams of the same convergent type together with compensation beams of different types.

Focusing of the transducer 10 at focal point F in focal plane 26 is shown in FIGS. 1 and 2. There, the beam when focused at point F is identified by reference character 32. In FIG. 2, a second, coaxial, beam 34 is shown, which beam is employed when obtaining compensation pixel signal values. Operation of the system to obtain compensation pixel signal values using beam 34 is described in detail herein below following description of the system operation using beam 32 to obtain image pixel signal values. As mentioned above, ultrasonic reflex transmission systems for obtaining image pixel signal values are well known as shown in U.S. Pat. Nos. 4,608,868, issued Sept. 2, 1986; 4,624,143, issued Nov. 25, 1986, and 4,730,495, issued Mar. 15, 1988, the entire contents of which patents specifically are incorporated by reference herein.

In the illustrated system, operation of the system to obtain image pixel signal values includes transmitting a focused beam 32 into the subject 12 using appropriate delay elements for focusing at focal point F. Reflected ultrasonic signals received by transducer array 10 from scatterers, or discontinuities, within the subject 12, or from reflecting means acoustically coupled to the subject opposite the transducer array, are converted to electrical signals at the transducer array elements. Electrical signals from the transducer elements are supplied to switching matrix 20, and switching matrix outputs are supplied to a summing amplifier 36 in a signal processor 38 through transmit-receiver switch means 18 and selected delays of delay means 22. By using the same signal delay means for both transmitting and receiving operations, the transducer is focused at the same focal point F during both operations.

The echo signals are combined at summing amplifier 36 and supplied to a variable gain amplifier 40, the gain of which amplifier is time varied in accordance with the output from a gain function generator 42 under control of timing and control unit 16. As is well understood, time variable gain is used to compensate for greater attenuation of return signals received from further within the subject. From variable gain amplifier 40, received signals are amplified by amplifier 44, and the amplified output is detected by use of envelope detector 46 comprising, for example, a full wave rectifier with low pass filter means and having as an output a signal that is proportional to the envelope of the high frequency signal output from amplifier 44.

The output from envelope detector 46 is supplied to a gated integrator 48 for time integration thereof during the time period that signals are received from within a backscatter zone, BZ, shown in FIG. 2. Gated integrator 48 is provided with gate enable and reset signals from timing and control unit 16 over lines 50 and 52, respectively. Gated integrator 48 is enable, i.e. gated on, during the time period that echo signals are received from backscatter zone BZ (see FIG. 2) located opposite focal point F from transducer 10. An image pixel signal value is produced at the integrator output which is substantially dependent upon attenuation of acoustic waves at the focal point F, and which also is dependent upon reflectivity of the backscatter zone volume from which return signals are received.

The image pixel signal value from integrator 48 is transferred to a display processor 54 over line 56 where it is applied to switch 58 which is under control of timing and control unit 16. In the illustrated full line switch position, the image pixel signal value is supplied to a first hold circuit 60 controlled by an output from timing and control unit 16 supplied thereto over line 62. In a manner described hereinbelow, at the following pulse transmission-receiver operation, integrator 48 produces a compensation pixel signal value which also is dependent upon reflectivity of backscatters in the backscatter zone BZ but which is substantially independent of attenuation at focal point F. The compensation pixel signal value from integrator 48 is supplied to a second hold circuit 64 through switch 58 in the broken line switch position. Hold circuit 64 also is under control of an output from timing and control unit 16 connected thereto over line 66.

The image and compensation pixel signal values from hold circuits 60 and 64 are supplied to combiner 68 where they are combined in such a manner as to provide a compensated image pixel signal value at the combiner output which is supplied to a scan converter 70. The combiner simply may comprise a divider for dividing the image pixel signal value by the compensation pixel signal value. However, other means for combining the signals may be employed for off-setting the signals. Also, non-linear functions of image and compensation pixel signal values may be combined. In any event, since both the image and compensation pixel signal values are dependent upon reflectively in the backscatter zone, but only the image pixel signal is dependent upon absorption at the focal point, any change in reflectivity of the backscatter zone as the focal point is scanned is substantially eliminated from the combiner output. The scan converter output is supplied to visual display means 72, such as a cathode ray tube, for visual display of the compensated image pixel signal values from the combiner.

To obtain a compensation pixel signal value, the transducer is not focused at any point within the backscatter zone BZ or at any point between the backscatter zone and the transducer, and integrator 48 is gated on for processing only those echo signals obtained from within the backscatter zone. Consequently, the level of the compensation pixel signal value is substantially independent of absorption of the echo signal at focal point F, or at any other point at which the transducer may be focused. In FIG. 2, the compensation beam 34 is shown focused at a point F1 opposite the backscatter zone from the transducer. Since only echo signals from within the backscatter zone are processed, it will be apparent that no echo signals from the focal point F1 are processed.

As seen in FIG. 2, with use of the two beams 32 and 34, a common backscatter volume 76 within the backscatter zone BZ is provided from which both image and compensation echo signals are obtained. Uncommon volumes within the backscatter zone are identified by reference characters 78A and 78B. For best removal of artifacts due to reflective inhomogeneity of the backscatter zone, maximum beam cross-sectional overlap within the zone is desired.

Figure 3:
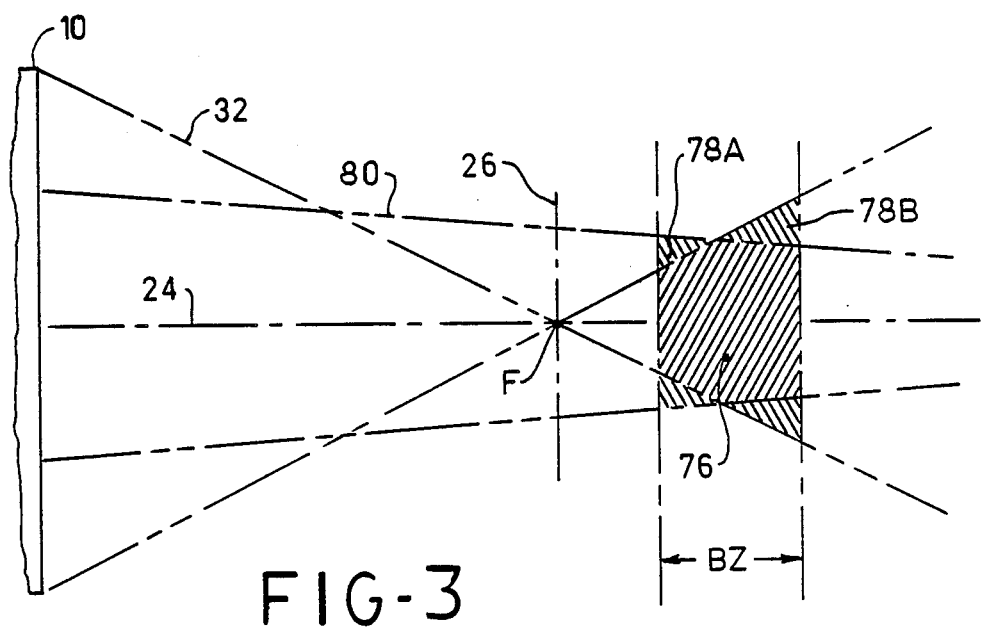

Reference now is made to FIG. 3 wherein use of a partial transducer aperture to obtain the compensation pixel signal value is illustrated. There, an image beam 32 using the full transducer aperture together with a compensation beam 80 using only a partial aperture is shown. A comparison of FIGS. 2 and 3 shows a greater common volume 76 for the partial aperture arrangement of FIG. 3 than for the full aperture arrangement of FIG. 2.

Figure 4:
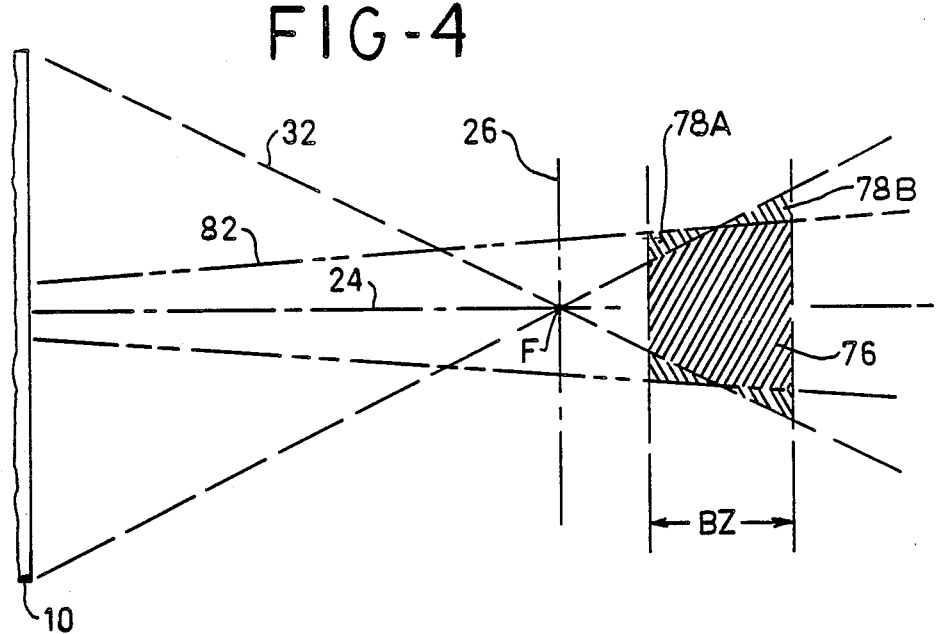

Although focusing of the image beam at a point ahead of the backscatter zone is required to obtain image pixel signal values, no such focusing of the compensation beam is required. In FIG. 4, to which figure reference now is made, the use of a full aperture image beam 32 together with a diverging partial aperture compensation beam 82 is shown. With this arrangement a greater common volume 76 and a smaller total uncommon volume (volumes 78A and 78B) are provided within the backscatter zone BZ than in either of the FIG. 2 or FIG. 3 arrangements. However, these two beams 32 and 82 have a substantially smaller common volume between the transducer 10 and backscatter zone BZ than in either of the FIG. 2 or FIG. 3 arrangements. It will be apparent that as the beam is scanned attenuation inhomogeneities in the beam path between the transducer and backscatter zone, apart from attenuation at the focal point, may result in artifacts in the image pixel signal values. The present compensation system may also reduce the effects of such attenuation inhomogeneities in the intervening object material.

Although he operation of the novel imaging system is believed to be apparent from the above description, a brief description thereof in conjunction with the timing diagram of FIG. 5 now will be provided. At time T1, control signals 90 and 92 set switch 58 to the illustrated full line position, and control matrix 20 for electronic focusing at focal point F, respectively. At time T2 the transducer array 10 is energized by transmit pulse output 94 from pulser 14 connected thereto through transmit-receive switch means 18 and selected delay elements of delay means 22 dependent upon the setting of switching matrix 20. In response to pulser output 94, transducer 10 generates ultrasonic energy beam 32 which is focused at focal point F within the object under examination.

The electronically focused ultrasonic wave pulse from transducer 10 travels into the object, and echo signals are received by the transducer where they are converted to electrical signals. The electrical signals from the transducer array elements are supplied to summing amplifier 36 in signal processor 38 through switch matrix 20, some delay elements of delay means 22 and some elements of transmit-receive switch means 18. During this receiving operation, transducer 10 remains electronically focused at focal point F, there being no change in control signal 92 to the switching matrix between the transmitting and associated receiving operations.

The resultant signal output from summing amplifier 36 is amplified by variable gain amplifier 40 and amplifier 44. The amplified signal is envelope detected by detector 46, the output from which detector is identified by reference numeral 96 in FIG. 5. Integrator 48 is enabled between times T3 and T4 by integrator enable control signal 98 supplied thereto over line 50. In FIG. 5, the output from integrator 48 is identified by reference numeral 100. Integration of the detector output 96, between times T3 and T4, is effected while echo signals are being received from backscatter zone BZ within a volume which includes common volume 76 and portion 78B of the uncommon volume. At time T5, the output from the gated integrator 48 is transferred through switch 58 to hold circuit 60 under control of control signal 102. At time T6, integrator reset signal 104 resets the integrator in preparation for the next transmission-receiving cycle.

Where focusing during both transmission and reception is employed, as in the illustrated arrangement, the received waves pass through the focus, F, twice, and the amplitude is strongly influenced by attenuation within it. It will be apparent, then, that the image pixel signal value stored in hold circuit 60 is dependent upon reflectivity within the backscatter zone BZ and is highly dependent upon absorption at the focal point F.

At time T7, control signal 90 operates to set switch 58 to the illustrated broken line position. At the same time, control signal 92 for switching matrix 20 changes the electronic focusing of the transducer in preparation for the next transmission-receiving cycle when a compensation pixel signal value is to be obtained. As described above, electronic focus control may be used to provide for a converging compensation signal beam, such as beams 34 and 80 shown in FIGS. 2 and 3, respectively, or a diverging compensation signal beam, such as beam 82 shown in FIG. 4. Alternatively, a collimated beam could be used to obtain the compensation pixel signal value. Regardless of the shape of the compensation signal beam, no focusing thereof at any point between the transducer and the back of the backscatter zone is provided since the compensation signal value is to be substantially independent of absorption at any focal point.

At time T8 pulser 14 is again enabled for pulse energization of the transducer array by transmit pulse 94. This time, a compensation signal beam is transmitted, and between times T9 and T10, integrator 48 is enabled by control signal 98 for integration of those echo signals that are received from backscatter zone BZ. Return signals for the compensation signal beam, such as beam 34 of FIG. 2, are obtained from the common volume 76 and portion 78A of the uncommon volume within the backscatter zone. After the integration period, at time T11, the output from gated integrator 48 is transferred through switch 58 to hold circuit 64 under control of signal 106, and at time T12 reset signal 104 resets integrator 48.

At time T13, control signal 108 is supplied to combiner 68 for combining the image pixel signal value from hold circuit 60 with the compensation pixel signal value from hold circuit 64. As described above, the combining means simply may comprise a divider for dividing the image pixel signal value by the compensation signal value. The output from combiner 68 comprises a compensated image pixel signal value which is supplied to scan converter 70 in preparation for display at display means 72. At time T14, control signals 90 and 92 are switched in preparation for the next transmission-receiving operation when the next image pixel signal value is obtained. With this invention, if reflectivity of the backscatter zone changes with changes in position of the beam axis as the field to be imaged is scanned, the effects of such reflectivity changes are substantially removed from the image pixel signal values constituting the image field.

The invention having been described in detail in accordance with requirements of the Patent Statutes, various other changes and modifications will suggest themselves to those skilled in this art. For example, memories capable of storing complete fields of image and compensation pixel signals may be substituted for the simple hold circuits 60 and 64. Then complete fields of image pixel signal values and compensation pixel signal values may be alternately obtained and stored. The outputs from the field storage means are supplied to a combiner for combining the image and compensation pixel signal values in the same manner as combiner 68; e.g. by dividing the image pixel signal values by corresponding compensation pixel signal values. The compensated signal values then are supplied to a display through a scan converter.

Figure 6:
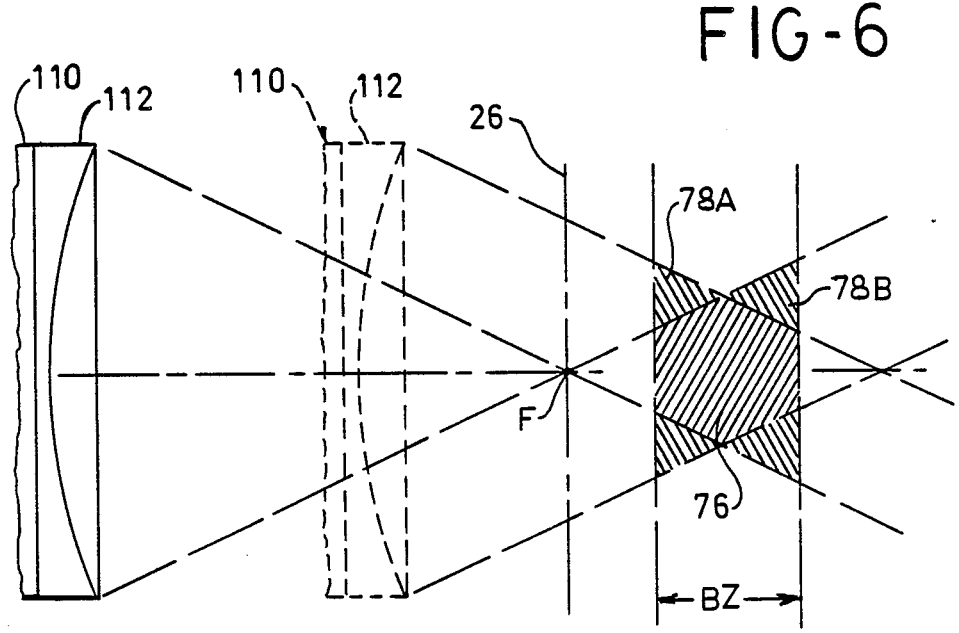
FIG. 6 shows a modified form of this invention employing a fixed focus transducer which is also axially movable for use in producing imaging and compensation beams.

In addition, a fixed focus transducer may be used in place of the illustrated electronically focused transducer. Reference is made to FIG. 6 wherein a plane transducer 110 is shown together with a focusing lens 112 for focusing at focal point F in the object under examination. As described above, the transducer and associated focusing lens 112 are scanned in the x and y directions shown in FIG. 1 by a scan actuator. A complete field of image pixel signal values is obtained, and stored in first storage means, in a manner described above. The transducer then is repositioned closer to the focal plane 26 as shown in the broken-line position in FIG. 6. A suitable displacement, for example, is twice the distance from focal plane 26 to the center of the backscatter zone BZ.

The delay between generation of a transmitter pulse 94 and the control signal 98 for gated integrator 48 is foreshortened so that the backscatter zone from within which echo signals are processed coincides with the illustrated backscatter zone BZ used for obtaining the field of image pixel signal values. The transducer then is rescanned in the same manner used to produce the field of image pixel signal values to produce a field of compensation pixel signal values, which values are stored in second storage means. As described above, corresponding image and compensation pixel signal values are combined as by dividing the image pixel signal value by the compensation pixel signal value, and the resultant compensated image pixel signal value is supplied to a display through a scan converter for display thereof.

It will be apparent that artifact removal of the type described herein may be used in conjunction with a wide variety of reflex transmission imaging systems and methods. For example, it may be employed with a system for obtaining three dimensional images of a portion of the interior of a subject. With such systems, information for imaging at a plurality of different planes is obtained, and signals representative of different planes may be simultaneously displayed in separate color, or they may be combined to form, e.g. stereoptic pairs. Also B-scan images may be produced by displaying, as a function of range, the image signal values obtained from an integration zone located beyond each point in the B-scan image. Similarly, the invention is not limited to use with reflex transmission imaging systems which image one or more planes. Systems for imaging of irregular, or contoured, surfaces also are known. Regardless of the surface or type of image provided, artifact removal may be implemented by obtaining a compensation pixel signal value for each image pixel signal value and combining the corresponding signal values for the removal of artifacts.

Additionally, as noted above, the invention is not limited to use of any particular scanning pattern or use with any particular type focusing means. Also, electronic rater than mechanical beam scanning may be employed. Further, it will be understood that transducer focusing during transmission when obtaining image pixel values is not essential to this invention. For example, the backscatter zone may be illuminated by an unfocused beam, and the transducer may be focused at a point intermediate the transducer and backscatter zone only when receiving echo signals.

Obviously, digital signal processing methods rather than analog ones shown and described herein may be employed in the practice of this invention. Further, it will be apparent that receiver operations are well adapted for performance by software in a suitable programmed computer, or computers. Also, separate transmitting and receiving transducers which are closely located may be employed. Similarly, separate closely spaced transducers and signal transmitting and receiving means may be employed for obtaining the image and compensation signal values, which then are combined.

Also, gating of the receiver, or signal processor, at points other than at the gated integrator is contemplated. For example, gated amplifier means may be employed. Furthermore, it will be apparent that a chirped signal, or otherwise coded signal source, may be employed to generate a chirped or otherwise coded ultrasonic wave, together with a receiver for processing the chirped or coded echo signals such that the portion of received signal being detected and integrated from a backscatter zone represents information from a focal point within the subject when obtaining image pixel signal values and is independent of absorption at any focal point when obtaining compensation pixel signal values. Additionally, continuous rather than pulse operation may be employed using continuously variable frequency, or otherwise coded source and associated receiver.

Obviously a conventional C-scan image may be obtained at the same time a reflex transmission C-scan image is obtained by simply processing in a conventional manner those signals reflected from scatterers at the focal point used to obtain the reflex transmission image, then processing those signals received from the backscatter zone in the manner described. If desired, a low pass filter may be included in the connection of the compensation pixel signal values to the combining means for removal of noise produced primarily by the integration process.

In addition, the invention is not limited to the disclosed sequences of obtaining image and compensation pixel signal values. As described above, image and compensation pixel signal values are alternatively obtained in one arrangement, and in another arrangement entire fields of image and compensation pixel signal values are alternatively obtained. Different numbers of image and compensation pixel signal values may be obtained, if desired. For example, values for one line of display may be alternately obtained. Also, if encoded pulses are used, as mentioned above, then two pulses of, say, different frequency may be transmitted one after the other, and echo signals from the two pulses from within a common backscatter zone may be processed by receiver means. Focusing of the transducer is changed between adjacent pulses and between reception of adjacent echo signals so as to obtain image and compensation pixel signal values in the course of one transmit-receive operating cycle comprising image transmit/compensation transmit-image receive/compensation receive operation. Obviously, the image and compensation pixel signal values may be obtained in any desired order, the invention not being limited to obtaining image pixel signal values before compensation pixel signal values. It is intended that the above and other such changes and modifications shall fall within the spirit and scope of the invention defined in the appended claims.

I claim:

1. In a reflex transmission ultrasonic imaging method with artifact removal for non-invasive examination of the interior of an object such as a body part from reflections from scatterers within a backscatter zone, steps including,
   beaming an imaging beam of ultrasonic energy into the object under examination to insonify the same and a volume within the backscatter zone,
   receiving by transducer means focused at a focal point ultrasonic imaging beam energy reflected from the backscatter zone and converting the same to imaging electrical signals,
   processing said imaging electrical signals to produce an image pixel signal value that is dependent upon reflectivity within the insonified volume of the backscatter zone and is substantially dependent upon and provides a measure of attenuation of the imaging beam at the focal point,
   beaming a compensation beam of ultrasonic energy into the object under examination to insonify at least a portion of the same volume of the backscatter zone insonified by said imaging beam, said compensation beam being unfocused at any point between the transducer means and back of the backscatter zone,
   receiving by transducer means compensation beam energy reflected from within said backscatter zone and converting the same to compensation electrical signals, said transducer means being unfocused at any point between the transducer means and back of the backscatter zone while receiving echo signals from the compensation beam,
   processing said compensation electrical signals to produce a compensation pixel signal value that is dependent upon reflectivity within said backscatter zone and is substantially independent of absorption at the focal point at which the transducer means is focused when receiving echo signals from the imaging beam, and
   combining said image and compensation pixel signal values to obtain a compensated image pixel signal value.

2. In a reflex transmission ultrasonic imaging method as defined in claim 1 wherein said transducer means is focused at a point opposite the backscatter zone from the transducer means when receiving compensation beam energy reflected from with said backscatter zone.

3. In a reflex transmission ultrasonic imaging method as defined in claim 1 wherein said transducer means is unfocused when receiving compensation beam energy reflected from within said backscatter zone.

4. In a reflex transmission ultrasonic imaging method as defined in claim 1 wherein said imaging and compensation beams are directed along substantially the same beam axis.

5. In a reflex transmission ultrasonic imaging method as defined in claim 1 wherein image and compensation pixel signal values are alternately produced by processing means responsive to said imaging and compensation electrical signals from said transducer means.

6. In a reflex transmission ultrasonic imaging method as defined in claim 1 wherein complete fields of imaging and compensation pixel signal values are alternately produced by processing means responsive to said imaging and compensation electrical signals from said transducer means.

7. In a reflex transmission ultrasonic imaging method as defined in claim 1 including focusing the transmitted imaging beam at said focal point.

8. In a reflex transmission ultrasonic imaging method as defined in claim 1 including scanning said beam while recurrently repeating the recited steps of claim 1.

9. In a reflex transmission ultrasonic imaging method for non-invasive examination of the interior of an object such as a body part from reflections from scatterers of ultrasonic energy, steps including
   transmitting a first ultrasonic energy pulse into the object along a beam axis,
   receiving by ultrasonic transducer means reflected ultrasonic energy and converting the same to electrical signals,
   focusing said ultrasonic transducer means at a focal point within the object when receiving the reflected ultrasonic energy,
   detecting electrical signals from the focused transducer means,
   integrating detected signals over a time period during which reflected ultrasonic energy is received from a backscatter volume within a backscatter zone for generating a pixel signal value that is dependent upon reflectivity of the backscatter volume and is substantially dependent upon attenuation of acoustic energy at the focal point,
   transmitting a second ultrasonic energy pulse into the object substantially along the beam axis of the first ultrasonic energy pulse, said second ultrasonic energy pulse being unfocused at any point between the transducer means and back of the backscatter zone,
   receiving by said ultrasonic transducer means reflected ultrasonic energy from the second transmitted pulse and converting the same to electrical signals, the ultrasonic transducer means being unfocused at said backscatter zone and unfocused at any point along the beam axis between said backscatter zone and the transducer means when receiving the echo signals from the second pule transmission, detecting electrical signals from the transducer means produced by the second pulse, integrating detected signals over a time period during which reflected ultrasonic energy is received from a second backscatter volume within said backscatter zone for generating a compensation signal value that is dependent upon reflectivity of the backscatter volume and is substantially independent of attenuation of acoustic energy at said focal point, the first and second backscatter volumes having a common volume within said backscatter zone, combining the pixel signal value and compensation signal value to provide for a compensated pixel signal value.

10. In a reflex transmission ultrasonic imaging method as defined in claim 9 including focusing said first ultrasonic energy pulse at substantially the same focal point at which the ultrasonic transducer means is focused when receiving echo signals from the first ultrasonic energy pulse.

11. In a reflex transmission ultrasonic imaging method for non-invasive examination of the interior of an object such as a body part from reflections from scatterers of ultrasonic energy, steps including, transmitting first and second imaging and compensation ultrasonic energy pulses, respectively, into the object along substantially a common axis, receiving by ultrasonic transducer means reflected ultrasonic energy from first and second backscatter volumes having a common backscatter volume within a common backscatter zone and converting the same to electrical signals, the ultrasonic transducer means being focused at a focal point within the object while receiving echo signals from the first ultrasonic energy pulse, in response to the electrical signal output from the transducer means produced by reflected signals produced by the first pulse, generating a pixel signal value that is dependent upon reflectivity of backscatterers in said first backscatter volume and is substantially dependent upon attenuation of acoustic wave energy at the focal point, the ultrasonic transducer means being unfocused at any point in said backscatter zone and unfocused at any point along the beam axis between the transducer means and backscatter zone while transmitting compensation ultrasonic energy pulses and while receiving echo signals from the compensation ultrasonic energy pulses, in response to the electrical signal output from the transducer means produced by reflected signals produced by the second pulse, generating a compensation signal value that is dependent upon reflectivity of backscatters in said second backscatter volume and is substantially independent of attenuation of acoustic wave energy at said focal point, combining the pixel signal value and compensation signal value to provide for a compensated pixel signal value.

12. In a reflex transmission type ultrasonic imaging method as defined in claim 11 including focusing said transmitted imaging ultrasonic energy pulse at substantially the same focal point at which the transducer means is focused when receiving echo signals from said imaging ultrasonic energy pulse.

13. A reflex transmission type ultrasonic imaging system for the examination of a section of the interior of an object, such as a body part, which includes, ultrasonic transducer means, pulse transmitter means for energizing said transducer means for producing imaging and compensation ultrasonic wave signals along substantially a common beam axis in the object, receiver means for processing electrical imaging and compensation signals produced by said transducer means upon receipt of imaging and compensating ultrasonic waves, respectively, reflected from within a backscatter zone, means for controlling the focus of the transducer means such that the transducer means is focused at a focal point within the object during receipt of reflected imaging signals and is unfocused at any point along the beam axis from the transducer means through the backscatter zone during transmission of compensation signals and during receipt of reflected compensation signals, said processing means being responsive to imaging and compensation signals for generating an image pixel signal value that is dependent upon reflectivity in the backscatter zone and is substantially dependent upon attenuation of acoustic waves at said focal point, and for generating a compensation pixel signal value that is dependent upon reflectivity in the backscatter zone and is substantially independent of attenuation of acoustic waves at said focal point, respectively, and means for combining said image and compensation pixel signal values to provide for a compensated image pixel signal value.

14. A reflex transmission type ultrasonic imaging system as defined in claim 13 wherein said combining means comprises means for dividing the image pixel signal value by the compensation pixel signal value to produce said compensated image pixel signal value.

15. A reflex transmission type ultrasonic imaging system as defined in claim 13 including beam scanning means for scanning the section to be imaged.

16. A reflex transmission type ultrasonic imaging system as defined in claim 15 which includes means for alternately obtaining complete fields of image pixel signal values and compensation pixel signal values.

17. A reflex transmission type ultrasonic imaging system as defined in claim 16 including means for moving said transducer means axially in the direction of the beam axis, said transducer means being moved to a position closer to the backscatter zone when obtaining compensation pixel values relative to its position when obtaining image pixel signal values.

18. A reflex transmission type ultrasonic imaging system as defined in claim 13 wherein said image and compensation pixel signal values are alternately generated by said processing means.

19. A reflex transmission type ultrasonic imaging system as defined in claim 13 wherein said transducer means is focused at said focal point during pulse transmission when producing said imaging ultrasonic wave signals.

20. A reflex transmission type ultrasonic imaging system as defined in claim 13 wherein said means for controlling the transducer means focus remains unchanged when both transmitting and receiving compensation ultrasonic waves.

21. A reflex transmission type ultrasonic imaging system as defined in claim 20 wherein said transducer means is focused at said focal point during pulse transmission when producing said imaging ultrasonic wave signals.

22. A reflex transmission type ultrasonic imaging system as defined in claim 13 including scanning means for scanning the section to be imaged.

* * * * *